UNITED STATES PATENT OFFICE.

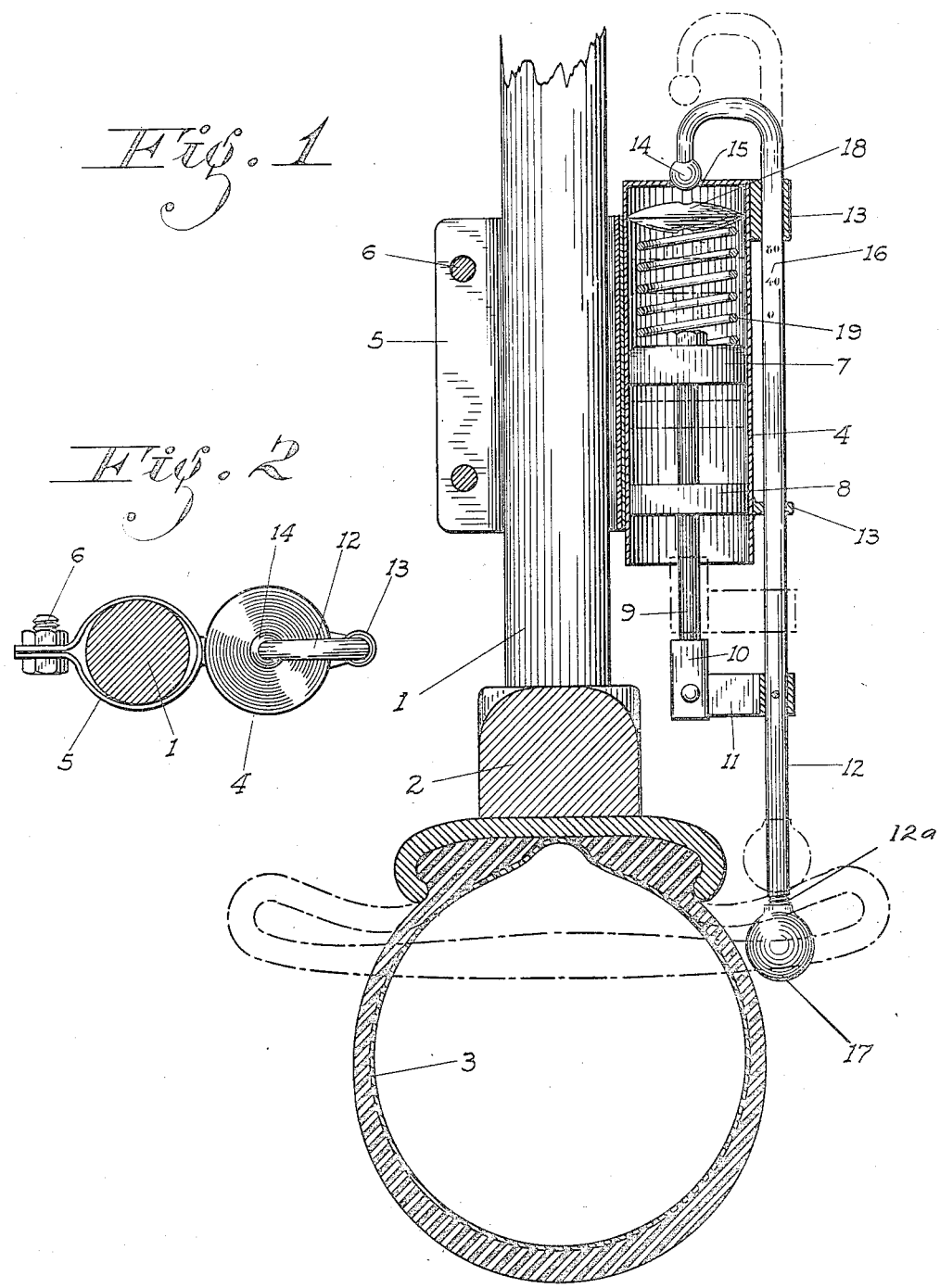

GEORGE E. THOMPSON, OF STOCKTON, CALIFORNIA.

PRESSURE-INDICATOR FOR PNEUMATIC TIRES.

1,289,307.

Specification of Letters Patent. Patented Dec. 31, 1918.

Application filed June 24, 1918. Serial No. 241,480.

*To all whom it may concern:*

Be it known that I, GEORGE E. THOMPSON, a citizen of the United States of America, residing at Stockton, in the county of San Joaquin and State of California, have invented certain new and useful Improvements in Pressure-Indicators for Pneumatic Tires; and I do declare the following to be a clear, full, and exact description of the same, reference being had to the accompanying drawings, and to the characters of reference marked thereon, which form a part of this application.

This invention relates to air pressure indicators, and particularly to a type for use with pneumatic tires as used on automobiles, the principal object of the invention being to produce a pressure indicator which will sound a sharp warning signal when a tire is becoming deflated while the car is being driven.

It frequently happens that a tire develops a slow leak while on the road, and the driver continues, not knowing the condition of his tire, until his attention is called to it or he can feel that he is riding on the rim. A tire which is allowed to run for any length of time on less than its normal air pressure is apt to become rim-cut, and the fabric thereof is put to a strain of the wrong kind, tending to lessen the life of the tire considerably. It has therefore been my aim to produce a device which will notify the driver of a lack of suitable pressure in the tire whenever the automobile is driven over a depression or slight obstacle which brings the springs of the car into sudden play and also causes a momentary pressure on the tires greater than normal. At such times, a lesser air pressure than the tire should normally carry is instantly made known to the driver of the car.

Another object of the invention is to produce a device by which the driver may tell at a glance the approximate air pressure in the tire while standing still.

A still further object is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a sectional elevation of my pressure indicator as attached to an automobile wheel.

Fig. 2 is a top plan view of the same.

Referring now more particularly to the characters of reference on the drawings, the numeral 1 designates a spoke secured in the usual felly 2, on which is mounted the pneumatic tire 3.

A cylinder 4 is vertically mounted to said spoke by means of a spring clamp 5 having clamping bolts 6.

Slidable in the cylinder 5 are pistons 7 and 8, respectively, suitably spaced, the piston 7 being of the ordinary leather cup construction, and the piston 8 being a plain metal piston for guide purposes. A piston rod 9 is secured to the said pistons and extends downwardly to a yoke end 10 mounted in which is a short horizontal arm 11, the outer end thereof being adapted to receive a rod 12 therethrough, the same being fixedly mounted therewith.

The rod 12 extends upwardly along the outside of the cylinder 4 passing through guide lugs 13 on the sides thereof, the upper end of the rod 12 being bent over and terminating in a bulb portion 14 adapted to seat in an orifice 15 in the top of the cylinder.

A plurality of numbers indicating the air pressure in pounds is marked on the rod 12 in any suitable location thereon, as at 16.

The lower end of the rod 12 terminates in a threaded portion 12$^a$, having a hard rubber ball 17 screwed thereon, this ball being located so as to bear against the side of the tire 3 when the pressure therein is about sixty pounds as compared to a normal pressure of eighty pounds, or in a similar ratio, depending on the size and make of the tire. When the pressure in the tire is normal however, the ball 17 is merely held adjacent the tire, the bulb 14 then being seated in the top of the cylinder and so preventing further downward movement.

Secured in the cylinder 4 near the top thereof is an air whistle 18 of the common double diaphragm type between which and the piston 7 is a spring 19 exerting a constant downward pressure.

In the operation of the device, the same is clamped securely to the spoke 1, being adjusted thereon to suit conditions while the tire is inflated to its normal pressure. Then, if the pressure should be lessened and the tire subjected to a spring shock such as while running over a rough road or across railroad tracks, as indicated by the dotted position of the tire in Fig. 1 of the drawings, the rod 12 is forced violently upward expelling the air in the cylinder 4 above the piston 7 through the air whistle 18, thus sounding a sudden and shrill note of warning to the driver of the car.

Should the pressure in the tire decrease, say to forty pounds while the car is lying idle, a glance at the indicating numbers on the rod 12 will inform the driver that he has only forty pounds in his tire, the said rod being pushed up and held there on account of the partial deflation of the tire.

Of course it is understood that the portion of the tire against which my device leans must be on the ground at that point.

The bulb 14 on the upper end of the rod 12 normally seating in the orifice 15 in the top of the cylinder 4, keeps dust and dirt from entering the same.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. An air pressure indicator for pneumatic tires comprising a cylinder secured to the wheel on which the tire is mounted, a rod slidably mounted on the outside of the cylinder and having one end adjacent the side of the tire, spring tension means mounted in the cylinder and connected to the said rod whereby the end of the same is normally held adjacent the tire, and pressure indicating numbers suitably located on the said rod whereby the pressure in the tire may be noted when that section of the tire on which the said rod bears is next the ground.

2. An air pressure alarm signal for pneumatic tires comprising a cylinder adjustably secured to a spoke of the wheel on which the tire is mounted, an air-tight piston slidable in said cylinder, an air whistle secured in the cylinder above the piston, a spring in said cylinder between the said air whistle and piston therein having a constant downward pressure, a piston rod secured to said piston and extending below the bottom of the cylinder, a rod slidably mounted on the outside of the cylinder and attached to the piston rod, the lower end being adjacent the side of the tire, and stop means on said rod normally preventing downward movement of the same.

In testimony whereof I affix my signature in presence of two witnesses.

GEORGE E. THOMPSON.

Witnesses:
VERADINE WARNER,
BERNARD PRIVAT.